US009145288B2

(12) United States Patent
Jenne

(10) Patent No.: US 9,145,288 B2
(45) Date of Patent: *Sep. 29, 2015

(54) TIPLESS CAN FILLING VALVE

(71) Applicant: Bevcorp LLC, Willoughby, OH (US)

(72) Inventor: Richard D. Jenne, Willowick, OH (US)

(73) Assignee: BevCorp LLC, Willoughby, OH (US)

( * ) Notice: Subject to any disclaimer, the term of this patent is extended or adjusted under 35 U.S.C. 154(b) by 170 days.

This patent is subject to a terminal disclaimer.

(21) Appl. No.: 13/941,992

(22) Filed: Jul. 15, 2013

(65) Prior Publication Data

US 2014/0096866 A1 Apr. 10, 2014

Related U.S. Application Data

(63) Continuation-in-part of application No. 12/834,886, filed on Jul. 12, 2010, now Pat. No. 8,496,031, which is a continuation-in-part of application No. 11/779,987, filed on Jul. 19, 2007, now Pat. No. 7,753,093.

(60) Provisional application No. 60/826,499, filed on Sep. 21, 2006.

(51) Int. Cl.
*B67C 3/26* (2006.01)
*B60K 15/04* (2006.01)
*B67C 3/06* (2006.01)

(52) U.S. Cl.
CPC ............... *B67C 3/2625* (2013.01); *B60K 15/04* (2013.01); *B67C 3/06* (2013.01); *B67C 3/2614* (2013.01); *B67C 3/2617* (2013.01); *B67C 2003/268* (2013.01); *B67C 2003/2657* (2013.01)

(58) Field of Classification Search
CPC ........ B60K 15/04; B67C 3/06; B67C 3/2614; B67C 2003/268; B67C 3/2617; B67C 3/2625; B67C 2003/3671; B67C 2003/266; B67C 2003/2668
USPC ............................ 141/57, 144–147, 285–287
See application file for complete search history.

(56) References Cited

U.S. PATENT DOCUMENTS

| | | | | |
|---|---|---|---|---|
| 3,067,785 | A | * 12/1962 | Meyer | 141/57 |
| 3,519,035 | A | * 7/1970 | Remane | 141/52 |
| 3,519,037 | A | 7/1970 | Remane | |
| 3,534,788 | A | * 10/1970 | Trusselle et al. | 141/392 |
| 3,626,996 | A | * 12/1971 | Bingham et al. | 141/5 |
| 3,683,976 | A | * 8/1972 | Remane | 141/59 |
| 4,089,353 | A | 5/1978 | Antonelli | |
| 4,349,055 | A | 9/1982 | DiChiara | |
| 4,442,873 | A | 4/1984 | Yun | |
| 4,750,533 | A | 6/1988 | Yun | |
| 4,938,261 | A | 7/1990 | Petri et al. | |
| 4,979,546 | A | 12/1990 | LaWarre, Sr. et al. | |

(Continued)

*Primary Examiner* — Timothy L Maust
(74) *Attorney, Agent, or Firm* — Porter Wright Morris & Arthur, LLP

(57) ABSTRACT

A filling valve is provided for filling containers such as beverage cans. The valve includes a tipless nozzle having ports oriented for directing flow. The nozzle includes a valve seat having a planar sealing surface. A spring actuated vent seal is provided for closing the vent tube. The valve stem may have protrusions for centering the stem in the valve body. The filling valve may have a bell forming a cavity between the bell and the valve body, and an aperture for directing cleaning fluid from within the bell to the cavity. The valve body may have a duct for directing cleaning fluid from the cavity to an outlet.

20 Claims, 12 Drawing Sheets

(56) References Cited

U.S. PATENT DOCUMENTS

| | | |
|---|---|---|
| 5,060,702 A | 10/1991 | LaWarre, Sr. et al. |
| 5,085,255 A | 2/1992 | LaWarre, Sr. et al. |
| 5,094,278 A | 3/1992 | Arao et al. |
| 5,139,058 A | 8/1992 | Yun |
| 5,141,035 A | 8/1992 | Nish et al. |
| 5,150,740 A | 9/1992 | Yun |
| 5,156,200 A * | 10/1992 | Mette ............................ 141/46 |
| 5,190,084 A | 3/1993 | Diehl et al. |
| 5,474,113 A | 12/1995 | Rademacher et al. |
| 5,884,677 A | 3/1999 | McKaughan |
| 5,924,462 A | 7/1999 | McKaughan |
| 5,944,072 A | 8/1999 | Tietz et al. |
| 5,954,100 A | 9/1999 | Nish et al. |
| 5,960,838 A | 10/1999 | Tietz et al. |
| 6,076,567 A | 6/2000 | Naecker et al. |
| 6,082,418 A | 7/2000 | Naecker et al. |
| 6,109,483 A | 8/2000 | Wilke et al. |
| 6,112,778 A | 9/2000 | Nish et al. |
| 6,131,624 A | 10/2000 | Paradies |
| 6,135,166 A | 10/2000 | Paradies et al. |
| 6,155,314 A | 12/2000 | Ding et al. |
| 6,179,016 B1 | 1/2001 | Neacker et al. |
| 6,223,435 B1 | 5/2001 | Stavrakis |
| 6,230,767 B1 | 5/2001 | Nelson |
| 6,244,309 B1 | 6/2001 | Martin |
| 6,390,148 B2 | 5/2002 | Martin |
| 6,397,909 B1 | 6/2002 | Nelson |
| 6,484,762 B2 | 11/2002 | Fehland et al. |
| 6,742,556 B1 | 6/2004 | Osuna et al. |
| 7,127,870 B2 | 10/2006 | McRay et al. |
| 7,287,562 B2 | 10/2007 | Tanikawa et al. |
| 8,006,464 B2 | 8/2011 | Krulitsch |
| 2006/0283518 A1 | 12/2006 | Ricker |

\* cited by examiner

TIPLESS CAN FILLING VALVE

This application is a continuation in part of U.S. patent application Ser. No. 12/834,886 filed Jul. 12, 2010, which is a continuation in part of U.S. patent application Ser. No. 11/779,987, filed Jul. 19, 2007, which issued on Jul. 13, 2010 as U.S. Pat. No. 7,753,093, which claims the benefit of U.S. Provisional Application 60/826,499, filed Sep. 21, 2006, the disclosures of each of which are incorporated herein by reference.

TECHNICAL FIELD

In automatic beverage filling machines, the developments relate to the filling valves associated with such machines to allow for more accurate and higher speed filling processes.

BACKGROUND

Beverage cans may be filled by automated container filling systems, wherein an empty can or other container is engaged with a filling valve, and the beverage dispenses from the filling valve into the can. One automated container filling system provides counterpressure filling, in which the can is filled with pressurized gas before the beverage is dispensed. In one counterpressure filling system, a filling valve includes a seal that expands against the top of the can, thereby sealing the inside of the can for containing pressurized gas.

In general, a plurality of cans move through a rotary filler. Empty cans are presented to the filling valve as the rotary filler turns. After the filling valve fills the can, the can moves off of the rotary filler. In valves associated with known machines, various deficiencies are found to effective and fast filling procedures. One problem noted with known valves relates to the liquid seal within the valve, which has a wedge-shaped sealing surface which contacts a wedge seal seat, wherein the liquid seal has the tendency to be frictionally engaged in a manner that causes hesitation when opening the valve, thereby causing a short fill. Further, the liquid seal seat formed in such known valves has been formed integral with the valve body, so that it is not replaceable apart from the entire valve. A further impediment to achieving desired fill time with the known valve relates to the use of a screen positioned just beneath the sealing surface to assist in stopping flow of the liquid upon valve shutoff. The position of the screen is well above the valve outlet, allowing a significant amount of liquid to continue to drip from the valve after closure, and causing delay in completion of the fill Other delays in the filling process are found in the need to snift a significant volume of gas upon completion of the fill from the headspace in the valve. Loss of liquid contents also could occur by the liquid entering the space around a can sealing member during the fill process, and being retained in association with the valve behind the can sealing member. Additional problems with known valves are found in the manner in which liquid is directed into the can or other container. With a can, known valves direct the liquid in a spiral fashion, but introduce the liquid in a direction which is well below the top of the can. This can cause disruption in the flow of the liquid into the container as the fill height increases.

Another problem with prior valves has been their ability to fill containers in a manner to reduce foaming or for filling containers of differing sizes. For example, as it is desired to fill the container as quickly as possible, introduction of the liquid is performed with the valve fully opened, which can result in excessive foaming. Further, a valve for filling a small can may cause foaming and/or excessive fill times when used for filling a large can and vice versa. This causes lost product, or inaccurate filling, or lost production due to change-over from one valve to another to accommodate various containers. Other problems, including limitations to proper cleaning of such valves, and others, have been noted.

SUMMARY OF THE DISCLOSURE

One embodiment provides a filling valve for filling a container a valve body having a chamber, a nozzle assembly being connected to the chamber, the nozzle assembly comprising a nozzle comprising an outlet and a peripheral surface about a central axis, an expandable sealing member operably positioned around the peripheral surface without interruption for substantially preventing liquid from flowing into an area about the peripheral surface, and positioned above the outlet for sealably engaging a container, the seal being capable of being expanded by a pressurizing gas, a vent tube positioned vertically above the nozzle, at least one aperture in the nozzle assembly near the sealing member, and a fluid passageway operatively positioned for communicating pressurizing gas from the vent tube through the at least one aperture in the nozzle for expanding the sealing member.

In an embodiment, the filling valve comprises a valve body having a chamber, a nozzle connected to the valve body, a valve seat having at least one aperture connecting the valve body chamber with the nozzle, a valve stem adapted to operatively move between a valve open position and a valve closed position to control a flow of fluid through the at least one aperture, a vent tube positioned vertically above the nozzle comprising a vent seat therein, a rod operably positioned to selectively close the vent seat blocking the flow of gas through the vent tube, a cap being vertically positioned above the valve stem and vent tube and selectively contacting the valve stem, the cap comprising an aperture, an end of the rod extending there though, a valve cam being positioned above the cap, the valve cam comprising a bearing surface adapted to push the rod axially downward to close the vent seat and the cap and valve stem axially downward into the valve closed position, the valve cam further comprising a groove through a portion of the bearing surface positioned for the end of the rod to operably move upward into the groove opening the vent seat while the valve stem is in the valve closed position when the valve cam rotates on the cap.

DETAILED DESCRIPTION OF THE DRAWINGS

Figure 1:
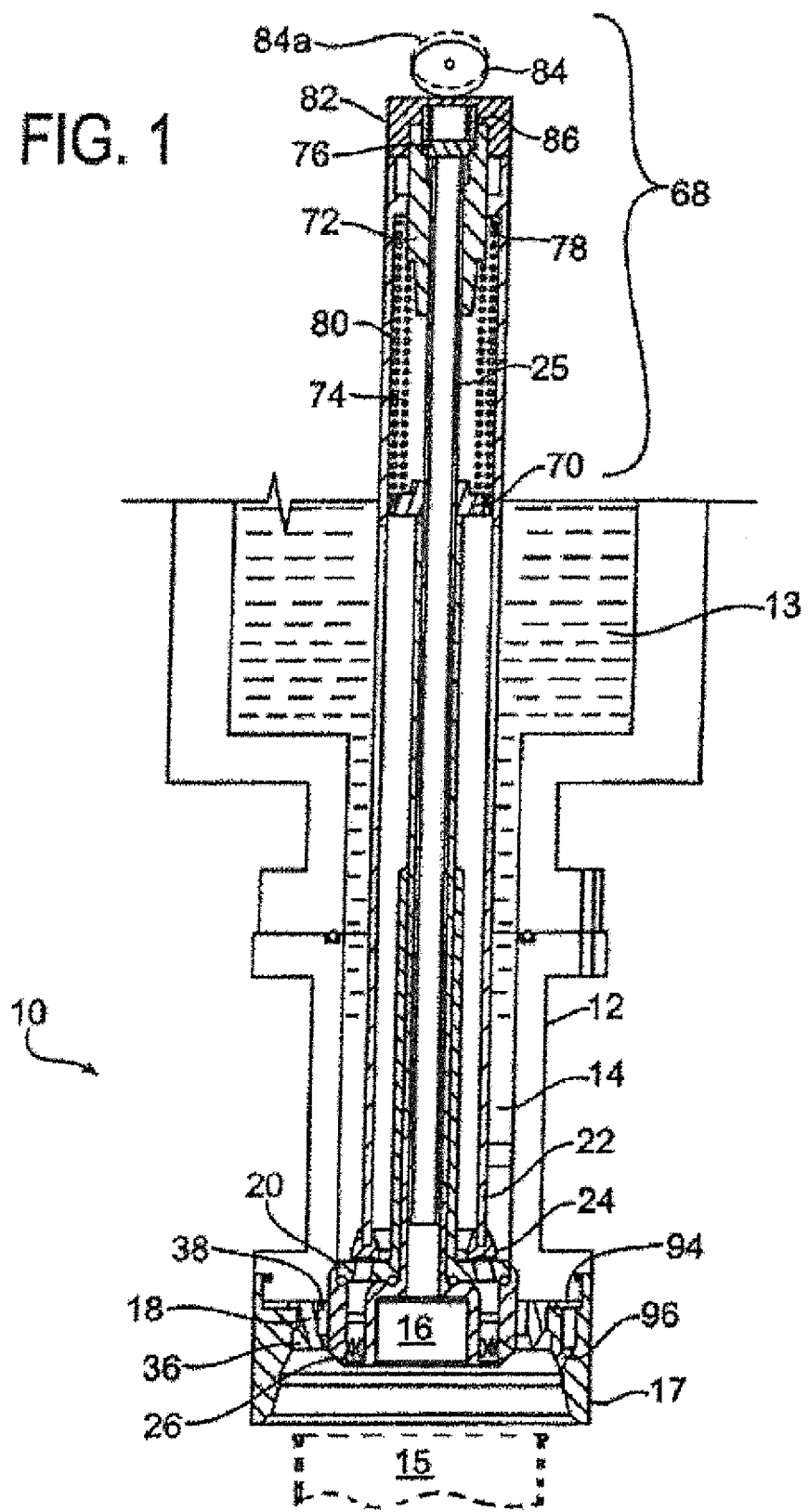
FIG. 1 is a partial cross sectional view through one embodiment of the filling valve.

The disclosure is directed to a filling valve which is generally functionally related to filling valves in widely used and long known filling machines, including but not limited to filling machines known as Crown filler machines. Turning to FIG. 1, the filling valve 10 is characterized by a generally cylindrical valve body, or housing 12, positioned with a reservoir 13 so that a liquid beverage or other fluid will selectively flow therethrough from the filling machine bowl or reservoir 13, through a nozzle assembly comprising a valve sealing seat 20 and dispensing nozzle 16, to be dispensed into a beverage can or other container 15. The filling valve embodiment of FIG. 1 further comprises a bell 17 surrounding the dispensing nozzle 16 adjacent to container sealing member 18. A valve actuation system includes the valve seat 20, a valve stem 22, and a closure valve 24, cooperating to selectively operate the filling valve 10 between a valve-open position and a valve-closed position. In the embodiment of FIG. 1, a vent tube 25 is connected to the nozzle 16 and positioned within the valve stem 22. The vent tube 25 may be of a screw in type to be selectively screwed into engagement with the nozzle 16 or otherwise suitably attached. The filling valve 10 may operate between the valve-closed and valve-open positions by the operation of an actuating assembly, generally indicated 68, which is capable of selectively opening the vent tube 25 and lifting the valve stem 22 for selective opening and closing of the valve 10.

The filling nozzle 16 is positioned at an operative end of the filling valve for directing fluid into the container 15. In one embodiment, the container is presented so that a mouth or opening on the container is beneath the nozzle 16. A container nest or conveying apparatus may lift the container into a filling position. Alternatively, the filling valve may move into the filling position. Methods and devices for presenting an empty container, such as but not limited to a can, to a filling valve are generally known in the art.

In one embodiment, the filling valve 10 is arranged in a vertical axial orientation with the chamber 14 being cylindrical about a centerline axis. In the embodiment of FIG. 1, the reservoir 13 is positioned vertically above the housing 12 such that the reservoir 13 is in fluid communication with the chamber 14. In this embodiment, the valve stem 22 extends from within the housing 12 into the reservoir. In the embodiment of FIG. 1, fluid contained by the reservoir 13 flows from the reservoir into the valve body chamber 14 and into the valve stem 22 by the force of gravity. In alternate embodiments, the chamber 14 may not be cylindrical, and it is contemplated that the valve 10 and/or chamber 14 may be angled or oriented in other non-vertical positions.

In one counterpressure filling embodiment, the reservoir 13 contains fluid and a pressurizing gas above the fluid, or in the head space of the reservoir 13. In this embodiment, shown in FIG. 1, the vent tube 25 extends above the fluid level into the pressurizing gas. The pressurizing gas may selectively flow through the vent tube 25 and into the container, causing the container 15 and the reservoir 13 to be substantially at the same internal pressure above 1 atmosphere during the filling process, discussed below.

Figure 2:
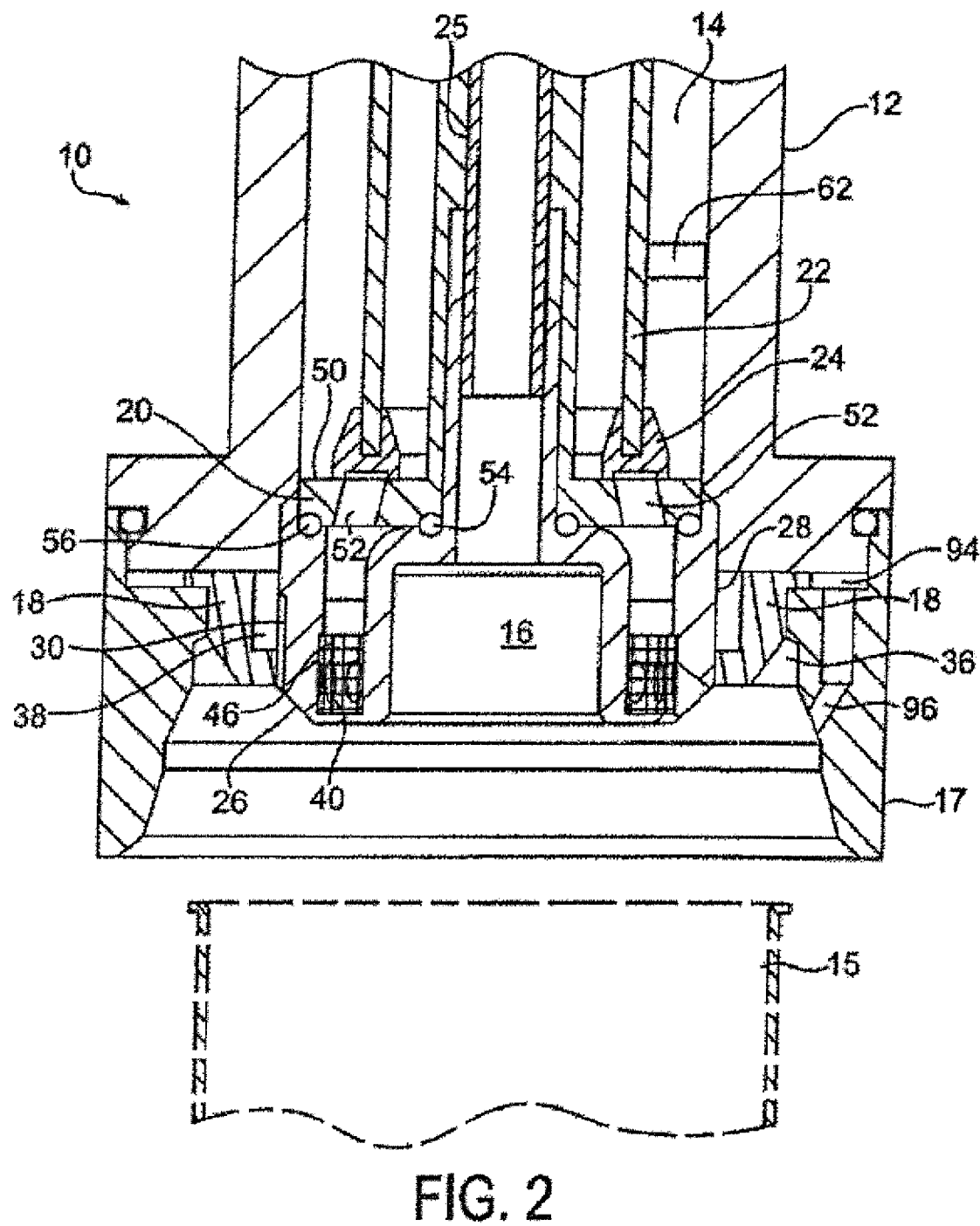
FIG. 2 is a partial cross sectional view through one embodiment of the filling valve.
Figure 3A:
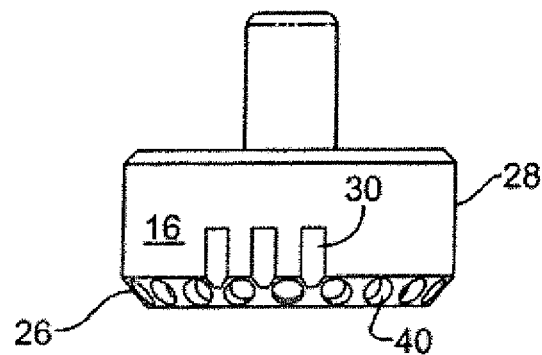
FIG. 3A and FIG. 3B are side views of an embodiment of a nozzle for a filling valve.
Figure 3B:
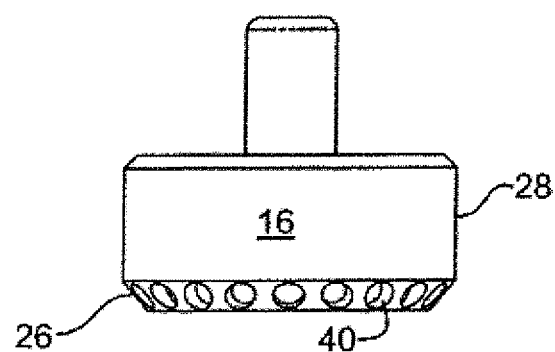

As shown in FIG. 2, the dispensing nozzle 16 may include at least one dispensing outlet 26 and a peripheral surface 28 about a central axis. As shown in FIG. 2, the nozzle peripheral surface 28 has a cylindrical shape. In this embodiment, the sealing member 18 is operably positioned around the peripheral surface 28 in close relationship and without interruption. Previously, a sealing member at this location included discontinuities to allow gas to pass through the space adjacent surface 28. As shown in the embodiment of FIG. 2 and FIGS. 3A and 3B, the peripheral surface 28 may include one or more grooves 30 extending under the sealing member 18. Alternatively, one or more apertures may be used to allow pressurizing of the sealing member 18 as discussed below, while the close positioning of the sealing member about the surface 28 prevents the ingress of liquid to a position behind the sealing member 18.

In one automated container filling system, the containers and filling valves are positioned on a rotating table. In the rotary filling system, the grooves 30, if present, may be positioned such that the grooves are oriented toward the center of the rotating table. In a rotary filling system, as the fluid is dispensed, centrifugal force lifts the fluid up the inner container surfaces oriented to the outside of the rotating table. By positioning the grooves 30 toward the inside of the rotating table, the centrifugally forced liquid does not enter the grooves 30. If apertures or the like are provided to pressurize the sealing member 18, they similarly may be positioned toward the inside of the rotating table so the centrifugally forced fluid may not enter the apertures.

Figure 4A:
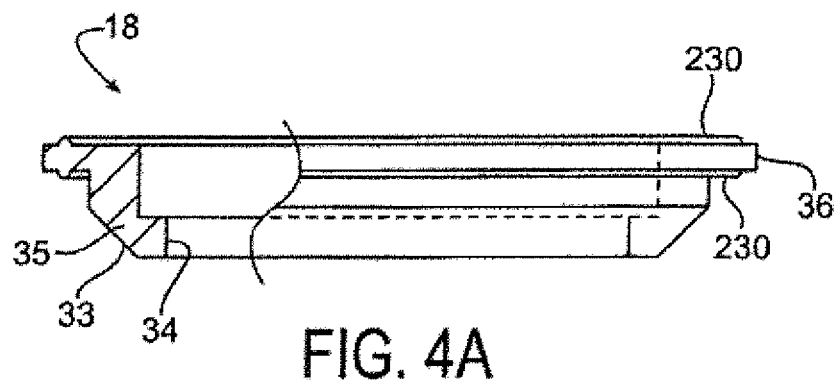
FIGS. 4A and 4B are a partial sectional views through a side view of embodiments of a seal member for a filling valve.

The sealing member 18 shown in FIG. 4A, has a substantially uniform cross section, and is positioned such that when the seal 18 is installed on the nozzle surface, the seal 18 has a can sealing portion 33 and a valve sealing portion 34 to seal the nozzle peripheral surface 28 to substantially prevent flow of any liquids past the seal. The discontinuities in past sealing members enabled liquid to flow past and into a space 38 as shown in FIG. 2. The configuration of the seal 18 prevents migration and retention of such liquid to the space or cavity 38, which may otherwise be subsequently improperly released to result in waste of any retained product. In this embodiment, the seal 18 does not include any notches or other structures to allow flow of pressurizing gasses as in the prior art, but instead seals against the surface 28 as described. The sealing member 18 comprises a container sealing surface 33, a valve sealing surface 34, and expanding portion 35 and a mounting flange 36. The seal has a size for sealably engaging the inner walls of the container. In this embodiment, the seal 18 comprises a flexible and resilient material suitable for preventing pressurized liquid from passing between the seal 18 and the inner top surface of the container.

The seal 18 may be made from a flexible and resilient material such as, but not limited to, a thermoplastic elastomer or rubber. The seal 18 comprises a shape such that at least a portion of the seal, an expanding portion 35, flexes or expands when the space behind the seal, or the seal cavity 38, is filled with pressurizing gas, causing further engagement of the container sealing surface 33 with the inner walls of the container. Thus, the seal is capable of sealing against the container when in the expanded or flexed position, thereby sealing the nozzle in the mouth or opening of the empty container and holding the pressurizing gas in the container at a selected pressure. When the pressurizing gas in the seal cavity 38 is released, the seal returns to its original shape and position. As shown in the various examples of the invention, the expanding portion 35 may be adapted to define with a portion of the nozzle assembly the gas passageway 38 adapted to deliver the pressurizing gas, and to allow release of gas from the container during the snifting process by means of snift valve 100 (see FIG. 5A), to be described hereafter.

Figure 4B:
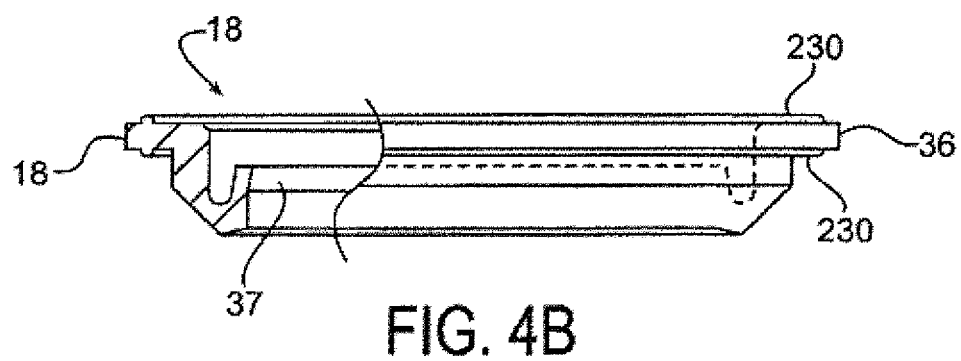

FIG. 4B illustrates an alternative embodiment of the seal 18, which further comprises a lip or flange 37 that extends upwardly from the valve sealing surface 34. The lip 37 is provided to engage channel seat or hook member 29 extending outwardly from the nozzle peripheral surface 28, as seen in the example of FIGS. 4B and 5A. The lip 37 positively engages the channel seat or hook member 29 of the nozzle assembly 116 (see FIGS. 5 and 5A) to further assist in preventing egress of liquid during pressurizing and depressurizing during filling and snifting. The lip 37 may be angled inwardly from the valve sealing surface 34, and in conjunction with channel seat 29 in the nozzle 116, further acts to prevent any egress of liquid from the filled can during snifting via snift valve 100. As seen in FIG. 5A, the lip 37 is captured under channel seat 29. In embodiments, seal 18 can be configured to interlock with one or more other components of valve 10. In an alternate example as seen in FIG. 5B, the seal 18 may also mate with a flange 27 which extends outwardly from the nozzle peripheral surface 44, to assist in preventing egress of liquid during filling and snifting.

As shown in FIGS. 2 and 4, the seal 18 may be mounted by capturing the flange 36 between the valve body 12 and the bell 17. Optionally, the seal 18 may include one or more protrusions 230 extending from an upper surface of the flange 36, a lower surface of the flange, or both, as shown in FIGS. 4A and 4B. If provided, the protrusion 230 may be positioned in corresponding grooves 232 provided in the valve body and/or bell as shown in FIGS. 5A and 5B. The protrusion(s) 230 and corresponding groove(s) 232 may be provided to lock the flange 36 in place and resist movement of the flange when the seal is in operation, as well as to act as an integral o-ring type of seal that prevents the loss of the liquid contents during the filling operation. As shown in FIGS. 4, 5A and 5B, the protrusions 230 and corresponding grooves 232 may be semicircular in cross-sectional shape, and may extend annularly around the seal 18. Alternatively, the protrusions 230 and corresponding grooves 232 may have any cross-sectional shape as desired, such as polygonal, arcuate, or other shape. Alternatively or additionally, the protrusions 230 and corresponding grooves 232 may be continuous or discontinuous annularly around the flange 36. Alternatively or additionally, the protrusions 230 and corresponding grooves 232 may be positioned radially around the flange 36, or in other arrangements as desired.

Figure 5:
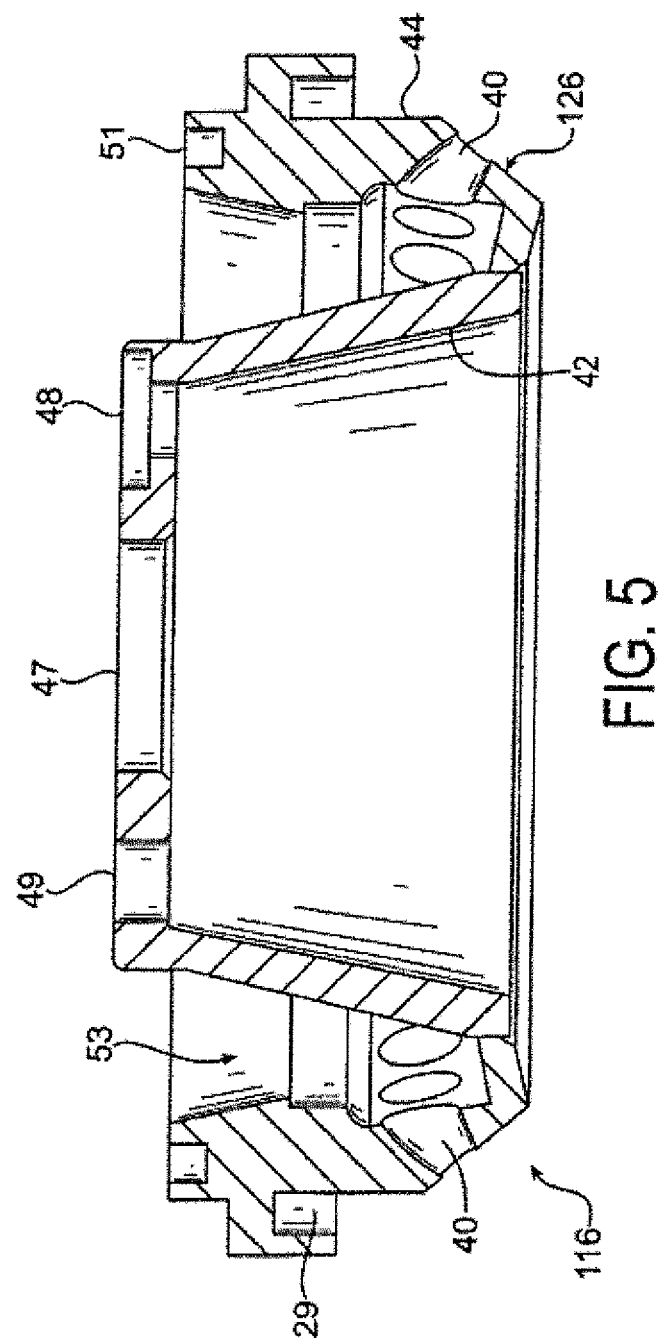
FIG. 5 is an elevational view of a separable nozzle according to an alternative example of the invention.
Figure 5A:
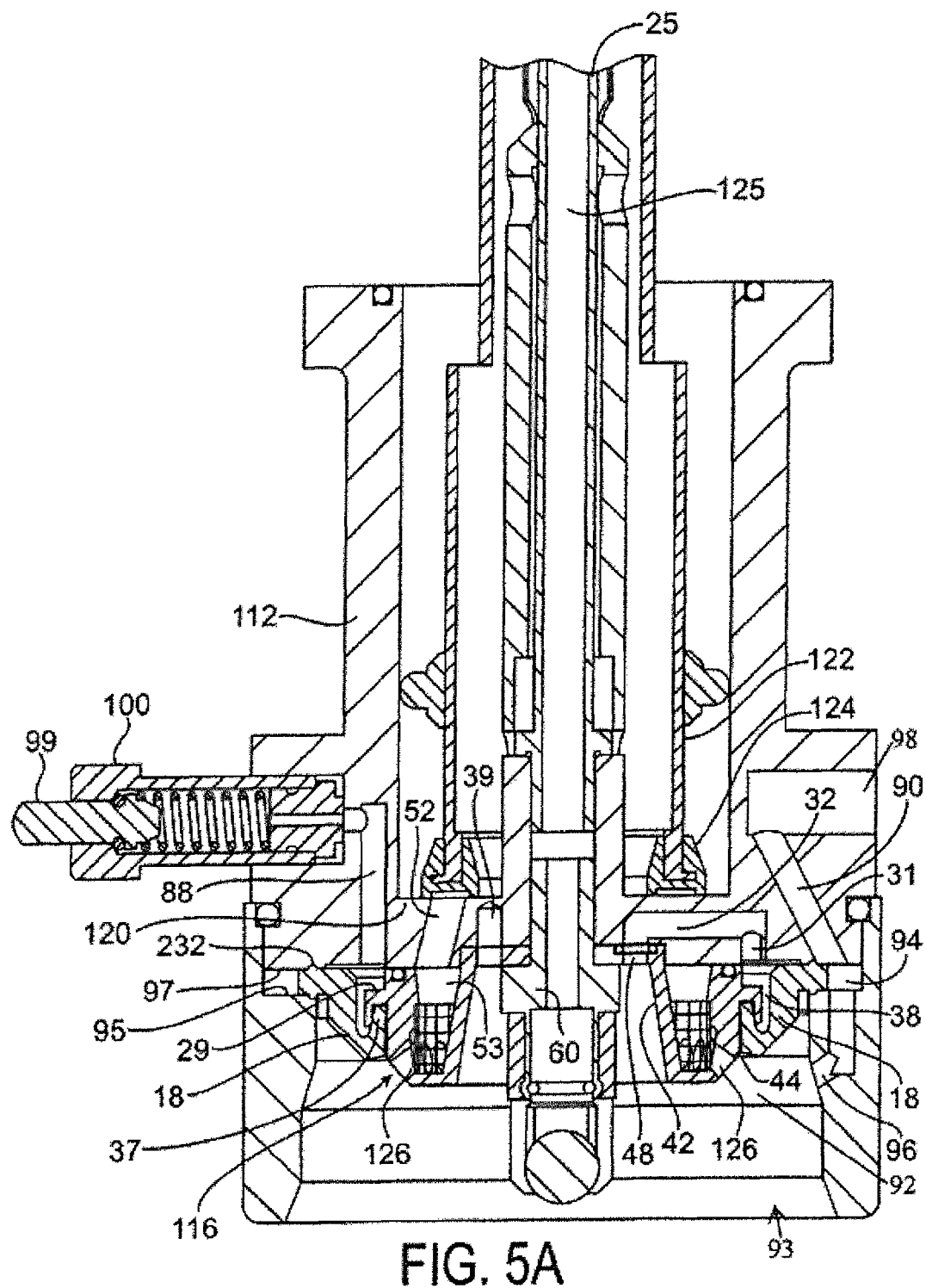
FIGS. 5A and 5B are partial cross sectional views through alternative filling valve configurations, FIGS. 6A and 6B provide end views of a nozzle with dispensing outlets formed therein, FIGS. 7A and 7B provide top and sectional views of an embodiment of a valve seal for a filling valve, FIGS. 8A and 8B provide top and partial sectional views of one embodiment of a valve closure seal for a filling valve.
Figure 5B:
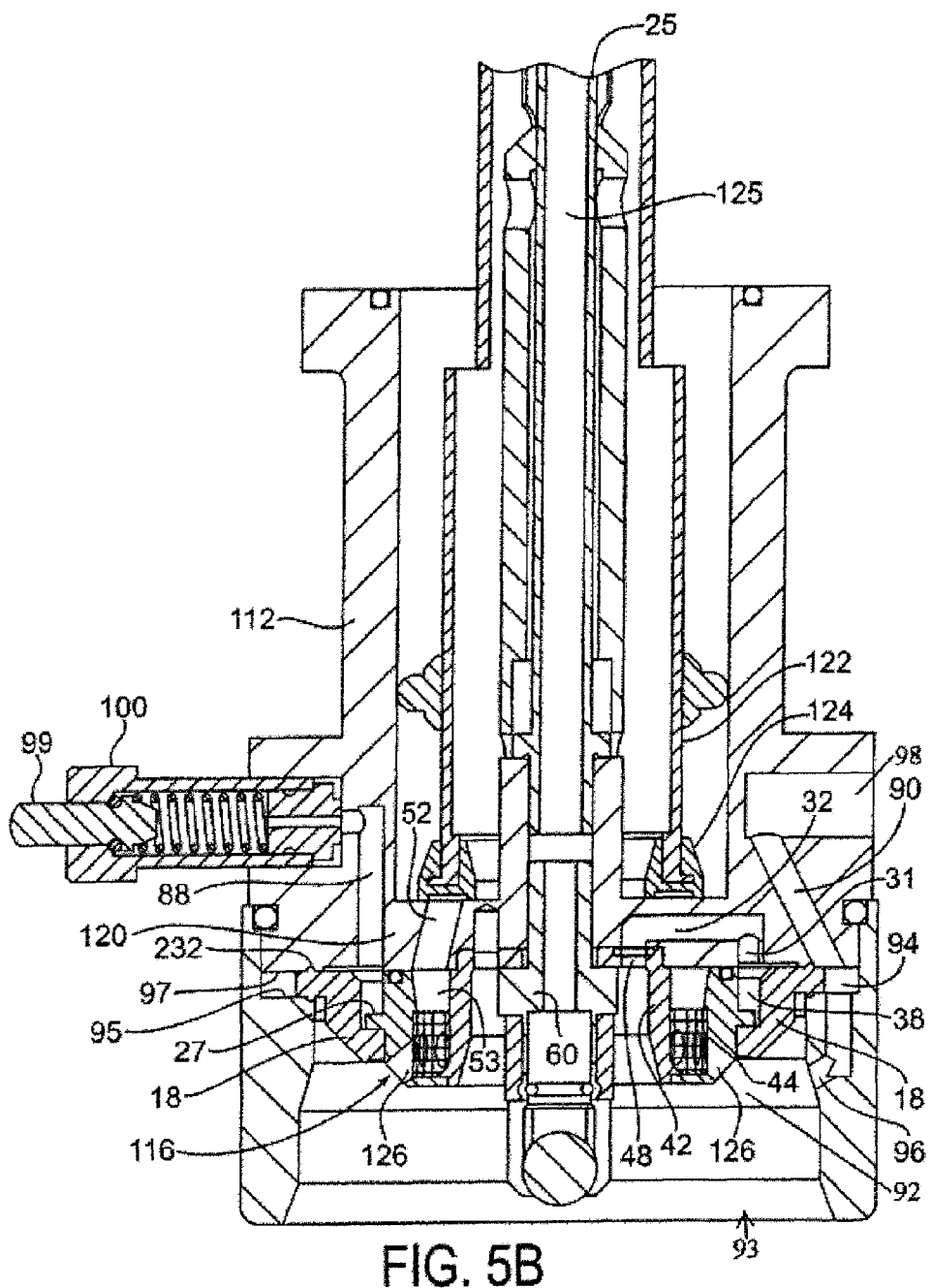

With reference to FIGS. 2 and 5, the empty container 15 may be lifted into a filling position having a sealing engagement with the seal 18 sufficient to hold the pressurizing gas in the container. When the empty container is provided in the filling position in sealing engagement with the seal 18, the pressurizing gas flows through the vent tube 25 and into the container 15 such that the pressure in the container may be substantially the same as the pressure in the reservoir 13. From the container 15, the pressurizing gas passes through the grooves 30 under the seal 18, in the embodiment of FIG. 2, filling the seal cavity 38 and causing the seal to flex or expand into further engagement of the container sealing surface 33 with the top interior walls of the container. Alternatively, in the embodiment of FIGS. 5A and 5B, the pressurizing gas from the vent tube 25 flows through the ball cage assembly 60 into the can. As gases continue to flow, the can is filled and gas flows into port 48 to port 32 in the nozzle assembly and out port 31 to fill the seal cavity 38 and cause the seal to flex or expand into further engagement of the container sealing surface 33 with the top interior walls of the container. The expanded seal 18 provides sufficient engagement with the container to allow additional pressurizing gas to be released into the container to achieve a pressure inside the container greater than 1 atmosphere. After the container is pressurized to substantially the same pressure as the pressure in the reservoir 13, liquid from the reservoir flows into the container 15 by way of the nozzle outlet(s) 26. Referring to FIG. 5A, to provide counterpressure to the can, the can bowl head space gases pass through tube 125 when the can is lifted into the seal 18. As pressure builds in the can, gases flow through inlet 48 into port 32 and out port 31. The port 31 leads to the cavity 38 formed in the can seal member 18 causing it to expand into sealing engagement on the can positioned on the valve. After filling, during the snift process, the top of vent tube 125 is sealed and snift valve button 99 of snift valve 100 is depressed. Port 88 communicates between snift valve 100 and the can seal cavity 38, via ports 31, 32, 48, the can head space, and vent tube 125, to slowly bring the filling pressure required back to atmospheric pressure.

Figure 6A:
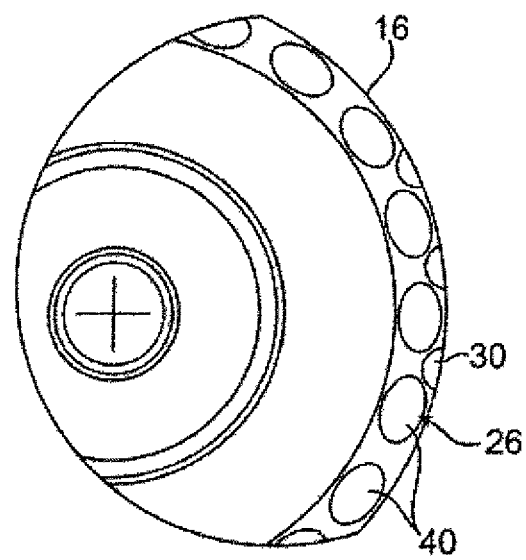
Figure 6B:
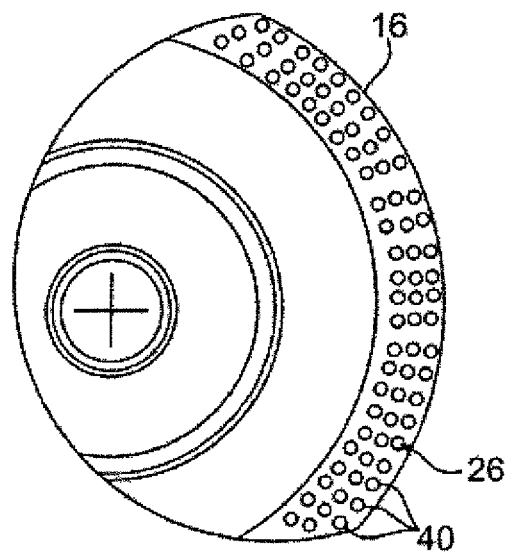

In one embodiment with reference to FIGS. 6A and 6B, the at least one nozzle outlet 26 may comprise a plurality of ports 40. The ports 40 comprise openings substantially level with an outer surface of the nozzle 16, and directional passageways in the nozzle. The directional passageways have inlets that are selectively in communication with the valve body chamber 14. In one embodiment, the ports 40 dispense fluid in a laminar flow. The passageways of the ports 40 may be oriented to dispense fluid in a downwardly direction defined by an outward angle, and possibly a tilt angle. The nozzle ports 40 may direct fluid in a direction having only an outward angle, only a tilt angle, or a combination of outward and tilt angles.

In one embodiment, the outward angle may be defined as an angle from a transverse plane perpendicular to the central axis of the nozzle 16. The outward angle may be provided for directing fluid against an inner wall of the container 15 during the filling operation. In one embodiment, the outward angle is within a range of approximately 30° to 70° from the transverse plane. In another embodiment, the outward angle is approximately 50° from the transverse plane. The outward angle may be selected to cooperate with the container being filled to decrease the amount of turbulent flow and increase the amount of laminar flow. Some containers, such as certain beverage cans, may have a lip or ridge near the mouth of the container. When filling containers with a lip or ridge, the outward angle may be selected to direct the flow of fluid against the inner wall of the container at a location beneath the lip or ridge.

The tilt angle may be defined as an angle from a radial plane parallel to the central axis of the nozzle 16. The tilt angle may be provided for directing fluid in a swirling direction during the filling operation of a cylindrical, spherical, or otherwise rounded container. In one embodiment, the tilt angle is within a range of approximately 10° to 40° from the radial plane. In an alternate embodiment, the tilt angle is approximately 20° from the radial plane. It is contemplated that the tilt angle may be selected to cooperate with the container being filled to decrease the amount of turbulent flow and increase the amount of laminar flow. The ability to provide laminar flow directed in a predetermined manner for any particular container 15 allows for faster fill times without having the liquid escape from the container due to the centrifugal force of a rotary filler for example.

In the nozzle embodiment as shown in FIG. 6A, the outlet 26 may comprise a number of ports 40 arranged around the nozzle, each port opening having a predetermined diameter, with a predetermined number of ports 40 provided. Depending on the filling requirements, the number of ports 40 is designed to enable a volume of liquid to pass therethrough in a predetermined period of time. For example, the number or ports 40 may be between 15 and 25, and have a diameter of approximately 0.15 to 0.20 inches, such as shown in FIG. 6A, or for example may comprise between 35 and 45 ports, each having an opening diameter of approximately 0.08 to 0.15 inches. Other nozzle embodiments are contemplated, such as having a larger number of ports 40, such as between 120 to 150, each having a port opening diameter, such as between 0.002 to 0.006 inches, such as shown in FIG. 6B. In a further embodiment, one port having an outward angle, and optionally a tilt angle, may be used. It is contemplated that the nozzle 16 may comprise any suitable number of ports for dispensing fluid into the container.

The configuration of ports 40 may be chosen with a balance of number of ports 40 relative to the diameter, to provide volume flow balanced with capillary action by the port size for reducing the flow of fluid from the ports when the valve is in the valve-closed position. Configurations allow for much faster fill times, up to 0.4 seconds faster than conventional systems. Thus, in one embodiment, the number of ports 40 is determined by considering the overall flow rate of fluid through the nozzle 16 compared to the amount of fluid that continues to flow from the ports after the filling valve is closed.

A screen 46 may be positioned between the valve body chamber 14 and the outlet 26. In the embodiment of FIG. 2, the screen 46 is vertically positioned inside the nozzle to cover the passageway inlets of the ports 40. By positioning the screen inside the nozzle 16, the screen 46 is generally protected from ambient air, and thus is maintained in the relatively acidic environment of the liquid and maintains cleanliness of the screen 46. In the embodiment of FIG. 2, the screen comprises a substantially cylindrical shape, positioned coaxially within the nozzle. In one embodiment, the screen is between 20 and 40 mesh. It is contemplated that the screen configuration may have a mesh size larger or smaller to accommodate the liquid being dispensed. The screen 46 may provide surface tension characteristics to restrict gas passage from the container 15 to the reservoir 13 when the filling cycle is complete but the valve is still open, and facilitates preventing flow of any liquid through the ports 40 when the valve is in the valve-closed position. The position of the screen 46 is also as low in the valve 10 as possible, and almost at the height of liquid in a container upon filling. This positioning provides less delay at the end of a fill cycle when a ball valve (not shown) seats in the vent tube as the liquid height reaches the fill height. Upon seating of a ball valve in association with the vent tube to stop flow of liquid, the position of the screen 46 eliminates any waiting for the last of the liquid product to run down into the container 15. This positioning also allows for a closer tolerance on the actual fill height of the container.

Figure 7A:
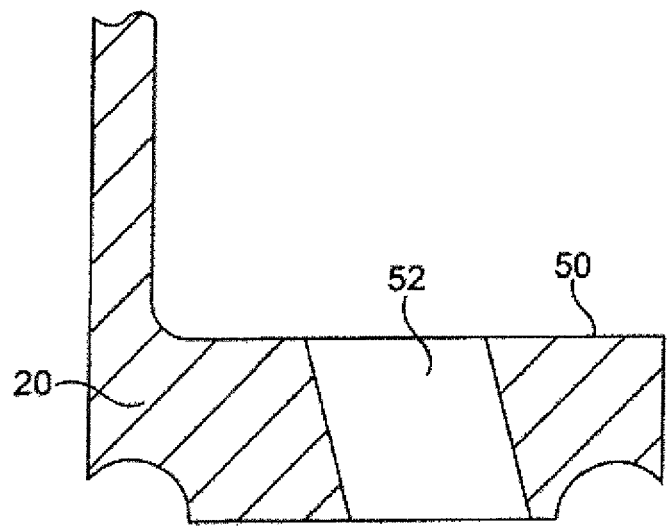
Figure 7B:
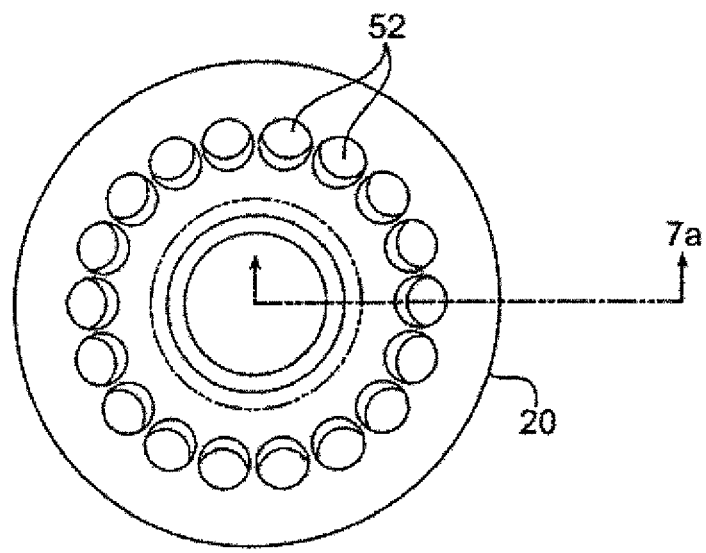

With reference to the nozzle assembly shown in FIG. 2, the nozzle 16 may be connected to the housing 12 by brazing. In this nozzle assembly, the valve seat 20 may be a replaceable valve seat 20, such as shown in FIGS. 7A and 7B. The valve seat 20 may comprise a substantially flat surface 50, and at least one filling aperture 52 through the valve seat 20 for connecting the valve body chamber 14 with the nozzle. In the embodiment of FIG. 7B, between 15 and 20 cylindrical apertures are used. In this embodiment, the filling apertures 52 pass through the valve seat 20 at an angle. In this embodiment, the valve seat 20 is selectively removable from the nozzle assembly for cleaning, maintenance, or to provide a valve seat having a different size and/or arrangement of filling apertures 52 providing fill characteristics as desired. As shown in FIG. 2, the valve seat 20 may be removably installed in the nozzle assembly with an inner O-ring 54 and an outer o-ring 56 to seal the valve seat 20 in association with the nozzle 16. Alternatively, the valve seat 120 may be integrated into the housing 12 as shown in FIG. 5. It is contemplated that the shape of the filling apertures 52 through the valve seat 20 may be cylindrical or slots or other shapes as desired. In an alternative embodiment, the valve seat comprises one or more conical surfaces comprising apertures. The ability to exchange the valve seat 20 may therefore allow the valve 10 to be reconfigured for different sized containers for example, such as smaller cans. The valve 10 may have the body reconfigured with a smaller nozzle to accommodate a smaller container 15, with the liquid seat 20 still fitting for use therewith.

Referring to FIGS. 5 and 5A, the example nozzle 116 is shown as a separate member that is mountable on the valve assembly, and allows a user to change out or replace the nozzle of the valve. For example, there are different size cans, and it is desirable to provide the nozzle 116 as removable, to allow it to be replaced on the valve with a different size seal or nozzle configuration. For example, three or more different size nozzles may be provided for cans that have an opening size of 1) 200, 202, 204, and 206 (written as inches+sixteenths of an inch (e.g. "202"=2 inches+2 sixteenths), 2) a 209 and 3) a 300 can. The nozzles and seals for cans having smaller or larger than a standard sized opening may be provided. Alternatively or additionally, the nozzle 116 may be removable for removing or replacing the screen 46. The nozzle 116 is formed as an integral member or may be assembled from two or more parts. The alternative nozzle 116 may have a nozzle outlet 126 including a plurality of ports 40. The nozzle assembly 116 may be configured to mate with a valve seat 120 in the valve assembly, as shown in FIGS. 5A and 5B for example. In these examples, the nozzle assembly 116 may removable from the valve seat 120 for cleaning, maintenance, or to provide a different configuration of outlet 126 having a different size and/or arrangement of ports 40, to provide different fill characteristics as may be desired. As shown in FIGS. 5, 5A and 5B, the nozzle 116 may comprise a nozzle inner portion 42 and a nozzle outer portion 44 forming a passageway 53 therebetween in communication with the filling apertures 52 through the valve seat 120. The nozzle 116 may be connected to the valve seat 120 by a threaded ball cage housing 60. At least one o-ring may be provided in the nozzle assembly between the nozzle 116 and the valve seat 120.

The nozzle 116 may include a central opening 47 to allow fastening of nozzle 116 to the valve seat 120 via the ball cage assembly 60. A port 48 fitted with an o-ring, is provided adjacent the valve seat 120 when mounted on the valve, and mates with a port 32 provided in the valve seat 120 as seen in FIGS. 5A and 5B. A port 49 is provided to mate with a nozzle alignment pin 39 in the valve seat 120. The nozzle ports 40 are formed in the lower portion of fill passage 53. An o-ring seat 51 is provided adjacent the exterior 44 to seal with the valve seat 120 when the nozzle 116 is mounted on the valve seat 120. The sealing member 18 is positioned on the outer portion 44 of the nozzle 116, and may engage with structures formed thereon. In the example of FIG. 5, the nozzle 116 may include further structure to prevent egress of liquid above the seal 18. In this example, a channel seat 29 may be formed on the nozzle exterior surface 44 to mate with or positively engage the seal 18 and/or structures associated therewith. In the example of FIGS. 4B, 5 and 5A, the seal member 18 is captured by the channel seat 29, and/or can interlock with various components of valve 10. The port 48 mates to the port 32, and create a gas passageway connecting the seal cavity 38 with port 32 for communicating pressurizing gas from the vent tube 25 through the port 32 into the seal cavity 38 through port 88 for expanding the sealing member 18. A snift valve 100, such as shown in FIGS. 5A and 5B, is provided in communication with the seal cavity 38 and the port 32 to release the pressurizing gas from the seal cavity 38 and the container thereby causing the seal to deflate disengaging the top interior walls of the container.

In the embodiment of FIGS. 5A and 5B, the sealing member 18 is operably positioned around the peripheral surface of the nozzle 116 in close relationship and without interruption. As discussed above, in the prior art, a sealing member at this location included discontinuities to allow gas to pass through, but enabled fluid from the container to pass through the discontinuities about the seal and mix with pressurizing gas releasing through the snift valve, causing product loss and ongoing maintenance caused by the spray of fluid through the snift. As it is desired to avoid fluid loss through the snift valve, in the embodiment of FIGS. 5A and 5B, the port 48 is positioned away from the fluid in the container 15 to eliminate the possibility of fluid entering the port 32. The port 48 is positioned inside the nozzle 116, and may be higher than the sealing member 18, without interrupting the seal between the nozzle 116 and the sealing member 18.

In embodiments such as those illustrated in FIGS. 5A and 5B, further structure to prevent egress of liquid above the seal 18 may include the flange 27 or hook member 29 formed on the nozzle exterior surface 44 to mate with or positively engage the seal 18 and/or structures associated therewith. In the example of FIGS. 4B, 5 and 5A, the seal member 18 is captured by the channel seat 29, and/or can interlock with various components of valve 10.

The nozzle assembly of FIGS. 5A and 5B includes a valve actuation system including the valve seat 120, a valve stem 122, and a closure valve 124, cooperating to selectively operate the filling valve between a valve-open position and a valve-closed position. In the embodiment of FIGS. 5A and 5B, a vent tube 125 is connected to the valve body 112 and positioned within the valve stem 122. The vent tube 125 may be of a screw in type to be selectively screwed into engagement with the valve body 112 or otherwise suitably attached. The filling valve may operate between the valve-closed and valve-open positions by the operation of an actuating assembly, discussed below.

Figure 8A:
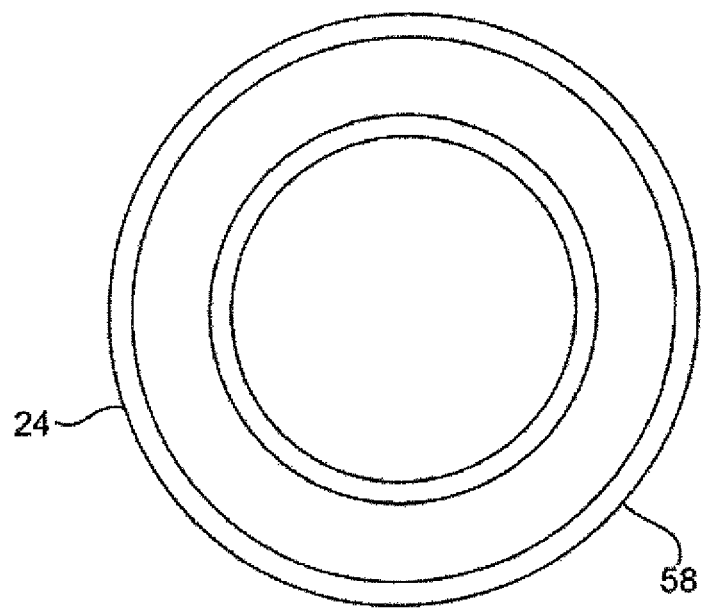
Figure 8B:
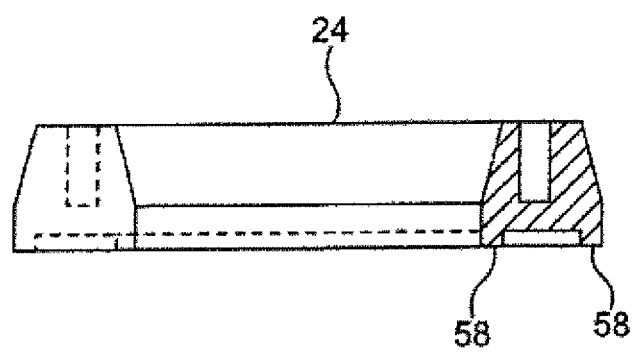

As shown in FIG. 2 and FIGS. 8A and 8B, the closure valve 24 is configured to control the flow of fluid through the at least one aperture 52. The closure valve 24 may be configured to close the at least one apertures 52 when the filling valve 10 is in the valve-closed position. In one embodiment, the closure valve 24 engages the flat surface 50. In the embodiment of FIGS. 8A and 8B, the closure valve 24 comprises one or more protrusions 58 for sealing against the flat surface 50. In this embodiment, the bosses 58 encircle the apertures 52. One or more bosses 58 may encircle one or more apertures 52. Alternately, bosses 58 may be configured to enter the apertures 52 in sealing engagement. The closure valve 24 may comprise a flexible and resilient material suitable for preventing pressurized liquid from passing between the closure valve 24 and the valve seat surface 50. Providing the seat surface 50 as a flat surface allows for proper sealing without undue engagement of the seating surface 50 with the closure valve 24 allows for faster filling without possible short fills due to sticking of the closure valve 24 upon filling. In the examples of FIGS. 5A and 5B, the closure valve 124 may be formed to engage with a downwardly extending flange on the valve stem.

Figure 9:
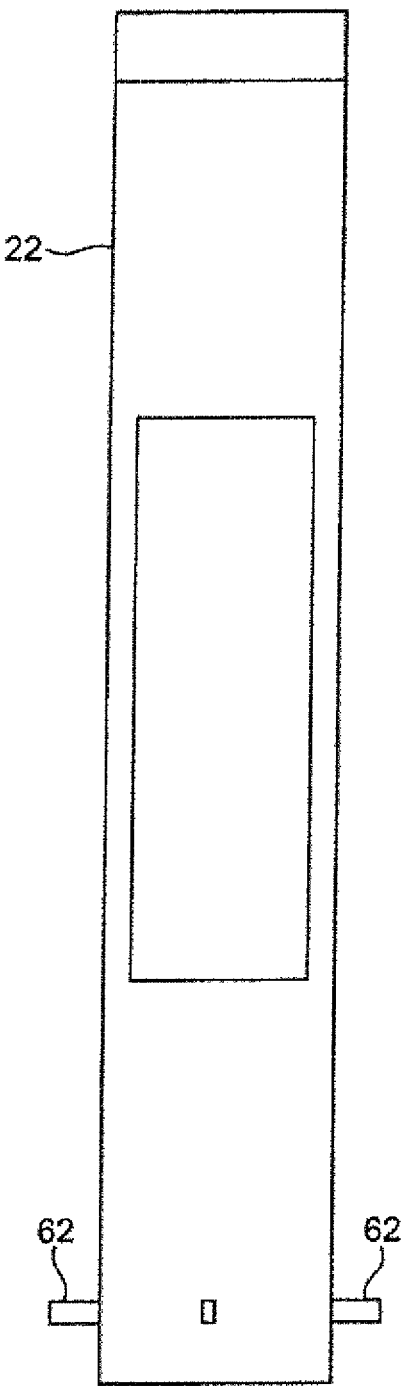
FIG. 9 is a side view of one embodiment of a valve stem for a filling valve.

The closure valve 24 is affixed to the valve stem 22 to allow opening and closing of the valve. As seen in FIG. 9, the valve stem 22 may comprise at least one boss 62 for guiding the stem 22 in the valve body chamber 14. In the embodiment of FIG. 9, the valve stem comprises a plurality of bosses 62 situated at 90 degree spacing around the stem 22. The bosses 62 may be integrally formed or separately attached. Other configurations to center the stem 22 without undue restriction to the movement of stem 22 are contemplated.

The filling valve of FIG. 1 further comprises the actuating assembly 68 capable of selectively moving the valve stem 22 and closure valve 24 between the valve open and valve closed position. In one filling valve embodiment, the actuating assembly 68 lifts up to move the valve stem 22 and closure valve 24 into the valve-open position, and presses down to move the valve stem 22 and closure valve 24 into the valve-closed position.

Figure 10:
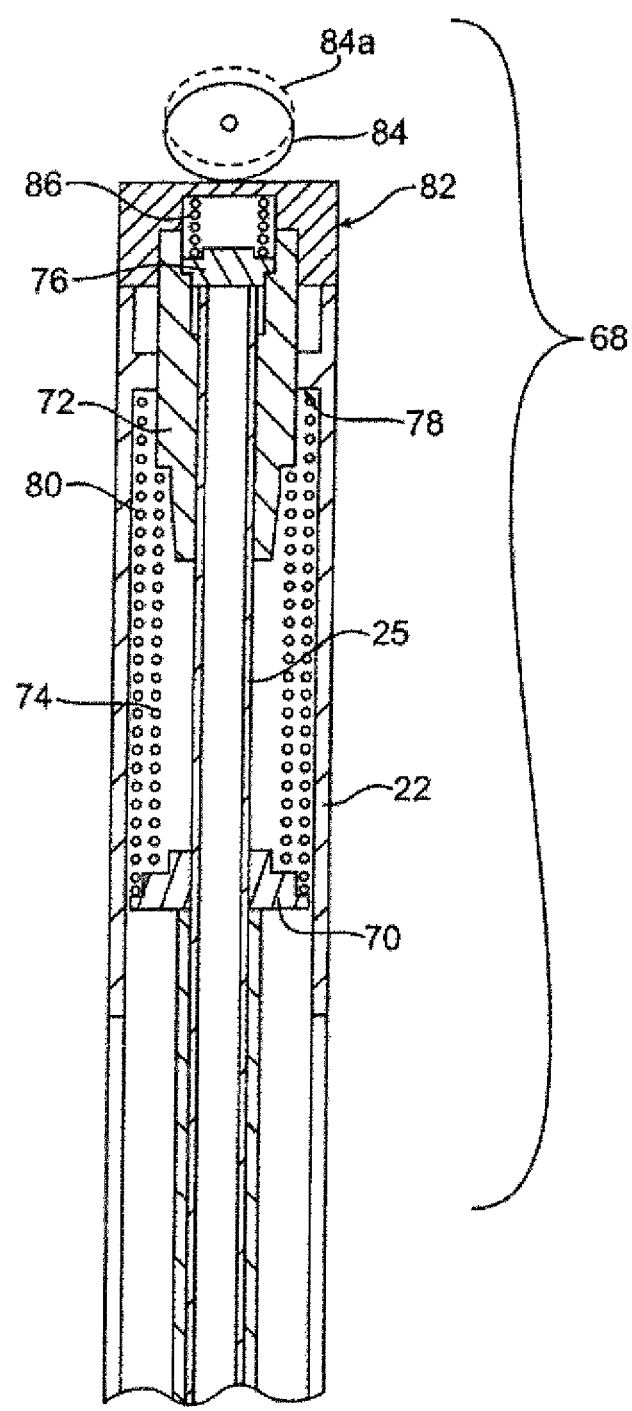
FIG. 10 is a partial cross sectional view of an embodiment of an actuating system for a filling valve.

As seen in FIG. 10, the actuating assembly 68 comprises an arrangement of systems and associated spring biasing members to allow for selected movement from and back to initial positions between valve open and closed conditions. Situated within the upper portion of the valve assembly, a counter pressure cap and assembly is provided, along with a valve seal actuating assembly. These assemblies allow for actuation of the valve operations in a desired sequence. A lower spring seat 70, an upper spring seat 72, and a pressure spring 74 are operably positioned between the lower spring seat 70 and the upper spring seat 72. In this embodiment, the lower spring seat 70 is positioned within the valve stem 22, and is in a fixed position relative to the valve seat 20 and the vent tube 25. The upper spring seat 72 may be positioned within the valve stem 22 above the lower spring seat 70, capable of translating in an axial direction adjacent to the vent tube 25. A vent seal 76 is operably positioned at the end of the vent tube 25 and capable of sealing the vent tube. The upper spring seat 72 and the vent seal 76 cooperate such that when the upper spring seat 72 translates axially upward, the upper spring seat 72 causes the vent seal 76 to disengage and thereby open the vent tube 25.

In this embodiment, the valve stem 22 comprises a stem spring seat 78 located within the valve stem and vertically positioned above the lower spring seat 70. A valve spring 80 is operably positioned between the lower spring seat 70 and the stem spring seat 78.

The actuating assembly 68 further comprises a cap 82 positioned above the valve stem 22, and a valve cam 84 capable of controlling the height of the cap 82. In one embodiment, the cap 82 translates axially up and down between an upper and a lower position, floating against the operatively moving valve cam 84, the cam being shown in an upper position 84a in FIG. 1. In this embodiment, the valve cam 84 provides a downward force on the cap 82 when moving to the lower position. As the cap 82 moves to the lower position, the cap pushes the upper spring seat 72 downward, thus compressing the pressure spring 74. When the valve cam 84 moves to the upper position, the pressure spring 74 presses the upper spring seat 72 against the cap 82, causing the upper spring seat 72 and the cap to translate upward with the valve cam 84.

The cap 82 may further be capable of pressing the vent seal 76 against the vent tube 25 when the cap 82 is in the lower position. In one embodiment, the cap 82 and the vent seal 76 are combined into one part.

In one embodiment, the vent seal is spring actuated, with a vent spring 86 operably positioned between the vent seal 76 and the cap 82 such that when the cap moves to the lowered position, the vent spring 86 presses the vent seal 76 against the vent tube 25 in sealing engagement. The vent spring 86 may be positioned to accommodate over-travel of the valve cam 84, for reducing or preventing damage of the vent seal 76, and vent tube 25. In this embodiment, the cam 84 may be set such that moving the cam to the cam lower position moves the closure valve 24 and valve stem 22 to close the valve seat 20. If in closing the valve seat 20 the cam 84 presses down farther than the distance required to close the vent tube 25, the vent spring 86 may absorb the excess travel of the cap 82 and cam.

In this embodiment, the cap 82 and the upper spring seat 72 cooperate such that when the cap moves to a lowered position, the cap causes the upper spring seat 72 to translate axially downward. Further, when the cap 82 is in the lowered position, the cap holds the valve stem 22 and correspondingly the stem spring seat 78 such that the valve seat 20 is closed and the valve spring is compressed. Thus, when the cap is in the lowered position, the cap causes the pressure spring 74, the valve spring 80, and the vent spring 86 to be compressed, the vent tube 25 being sealed by the vent seal 76, and the valve seat 20 being closed by the closure valve 24. Thus, when the valve cam 84 and cap 82 are in the lowered position, the filling valve 10 is in the valve-closed position.

When the valve cam 84 moves to the raised position, the compressed pressure spring 74 expands, lifting the upper spring seat 72. In this embodiment, the moving upper spring seat 72 pushes the cap 82 and the vent seal 76 axially upward, causing the vent seal 76 to disengage, thereby opening the vent tube 25. When the valve cam 84 moves to the open position 84*a*, the compressed pressure spring 74 causes the upper spring seat 72 to disengage the vent seal 76 from the vent tube 25. As described previously, the reservoir 13 may contain fluid and a pressurizing gas above the fluid. When the vent seal 76 disengages from the vent tube 25, the pressurizing gas in the head space of the reservoir flows through the vent tube and into the container. Once the pressure in the container substantially equals to the pressure in the reservoir 13, the compressed valve spring 80 overcomes the pressure in the reservoir holding the valve stem 22 and closure valve 24 against the valve seat 20, causing the valve stem 22 and closure valve 24 to lift, thereby opening the valve seat. Fluid then flows into the container. Thus, when the valve cam 84 moves to the open position 84*a*, the filling valve moves to the valve-open position.

As the fluid level rises in the container, the pressurizing gas in the container is forced back through the vent tube 25 and into the reservoir 13. When the container is filled to a desired level with fluid, pressurizing gas remains in the container above the fluid. The valve cam 84 then moves to the lowered position, pressing the cap 82 down causing the valve to close. The snift valve 100, such as shown in FIGS. 5A and 5B, is actuated causing the pressurizing gas in the container to vent, returning the container to atmospheric pressure. The head space in housing 12 where gas remains after filling is reduced such that the volume of gas required to be snifted is smaller, thereby allowing faster operation.

In an alternative embodiment, the filling valve may provide a variable flow rate through the valve as desired as the valve operates between the valve-closed and valve-open positions. The actuating assembly 68 may provide, for example, a restricted flow when the valve first opens, then full flow after the fluid begins to enter the container 15.

The fill valve 10 may also have a clean-in-place (CIP) system associated with housing 12. A first housing passageway 88 and a second housing passageway 90 may be formed in the housing 12. The first housing passageway 88 connects the seal cavity 38 to the snift valve. In the embodiments as shown in FIG. 5A or 5B, the first housing passageway 88 comprises an aperture through a wall of the housing for directing pressurizing gas from the seal cavity 38 to the snift valve 100.

The bell 17 is capable of surrounding the opening of the container 15 when the container is in the filling position. The bell 17 may have a substantially cylindrical shape having an inner area 92 surrounding the nozzle 16, and a lower opening 93 through which the container 15 is positioned. The bell 17 attaches to the housing 12 forming a fluid cavity 94 between a lower surface of the valve body, or housing 12, and an upper surface of the bell. The bell 17 comprises a bell passageway 96, or duct, connecting the bell inner area 92 to the fluid cavity 94. An inner upper surface 95 of the bell 17 presses the mounting flange 36 of the seal 18 against a lower surface 97 of the housing 12. In this embodiment, the fluid cavity 94 is an area bounded by the mounting flange 36, the housing lower surface 97 and the bell upper surface 95. The fluid cavity 94 may extend 360° around the filling valve 10.

The second housing passageway 90 connects the fluid cavity 94 to an outlet 98. In the embodiment of FIG. 2, the second housing passageway 90 comprises an aperture through a wall of the valve body, or housing 12, for directing fluid from the fluid cavity 94 out of the housing. In one embodiment, the fluid cavity 94 extends less than 360° around the filling valve 10, extending approximately from the bell passageway 96 to the second housing passageway 90.

In one embodiment, the filling valve may be cleaned by filling the reservoir 13 with a cleaning fluid and circulating the cleaning fluid through the filling valve 10. In one cleaning method, a cleaning cup is positioned to sealably engage a lower portion of the bell 17, preventing fluid from flowing out of the lower opening 93 of the bell. In this embodiment, a cleaning fluid conduit is affixed between the second housing passageway 90 to direct cleaning solution out of outlet 98 to a remote recirculating pump and back to the reservoir 13.

When the filling valve is opened, cleaning fluid flows out of the reservoir 13, through the nozzle 16 and into the bell inner area 92. The cleaning fluid flows through the bell passageway 96 into the fluid cavity 94. The cleaning fluid flows from the fluid cavity 94 into the second housing passageway 90, through the cleaning fluid conduit and outlet 98 to a remote recirculating pump and back to the reservoir 13. In one cleaning method embodiment, the cleaning fluid is circulated at an elevated temperature. The cleaning fluid may be maintained in a temperature range of approximately 185-190° F. (approximately 85-88° C.). In one method embodiment, the fluid circulates for approximately 20 minutes. In this embodiment, the CIP system provides more uniform and thorough cleaning of the valve surfaces. The CIP discharge port 98 is routed through the centering bell 17 and into the CIP port in the valve body where it is sent to the main return line. As the snift actuator 99 is operated during cleaning, the CIP solution is made to pass around the inside of the seal 18, for proper cleaning of all surfaces. This arrangement eliminates a CIP button on a two button valve, which would sometimes allow leakage past the valve when associated o-rings wear causing a low fill/no fill container on that valve. It also would allow drainage from the CIP piping to drip into a can in the valve. The new design will allow The CIP solution to enter into a port drilled into the upper interior portion of the bell (well away from the can opening) and lead into an isolated channel formed by the bell when screwed onto the valve. A second port hole is drilled into the back of the valve body and exits into a hose fitting which allows the CIP solution to be returned back to the CIP skid where it is reheated and returned to the filler.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. Additional features of the invention will become apparent to those skilled in the art upon consideration of the description. Modifications may be made without departing from the spirit and scope of the invention.

What is claimed is:

1. A filling valve for filling a container comprising:
    a valve body having a chamber;
    a nozzle assembly connected to the chamber, the nozzle assembly comprising
        a nozzle comprising an outlet,
        a ball cage, and
        a peripheral surface about a central axis, the peripheral surface comprising a channel seat extending outwardly from the peripheral surface;
    an expandable sealing member operably positioned around the peripheral surface without interruption, and positioned above the outlet, the expandable sealing member comprising an expanding portion, a container sealing surface for sealably engaging the container when the expanding portion is expanded by a pressurizing gas, a valve sealing portion for sealably engaging the peripheral surface when the expanding portion is expanded by the pressurizing gas, and a lip that extends upwardly from the valve sealing portion, the lip mating against the channel seat when the expanding portion is expanded by the pressurizing gas;
    a vent tube positioned vertically above and in communication with the ball cage; and
    a fluid passageway operatively positioned for communicating pressurizing gas from the vent tube to the container and then to a seal cavity for expanding the expanding portion of the sealing member.

2. The filling valve of claim 1, the nozzle assembly further comprising a valve seat having at least one aperture connecting the valve body chamber with the nozzle and a substantially planar sealing surface around the at least one aperture, and the filling valve further comprising a closure valve selectively engaging the sealing surface, adapted for controlling a flow of fluid through the at least one aperture.

3. The filling valve of claim 2, further comprising: a valve stem being adapted for operatively moving the closure valve between a valve open position and a valve closed position, the valve stem comprising at least one outwardly extending protrusion for guiding the valve stem within the valve body chamber.

4. The filling valve of claim 1, wherein an inner diameter of valve sealing portion sealably engages an outer diameter of the peripheral surface when the expanding portion is expanded by the pressurizing gas.

5. The filling valve of claim 1, further comprising a snift valve in communication with the seal cavity and the fluid passageway, the snift valve causing a release of pressurizing gas from the seal cavity, thereby causing the expanding portion of the expandable sealing member to deflate and disengage the container from the valve.

6. The filling valve of claim 1, wherein the channel seat is a flange extends from the peripheral surface, and the lip mates against the flange.

7. The filling valve of claim 5, wherein the lip angles inwardly from the valve sealing portion, and, when mated to the channel seat, further acts to prevent egress of a liquid dispensed into the container when the snift valve is engaged.

8. The filling valve of claim 1, where the nozzle is removable from the valve body.

9. The filling valve of claim 8, where the nozzle is removable to allow different nozzles for different sized containers to be positioned on the valve body.

10. The filling valve of claim 1, the outlet comprising: a plurality of ports oriented in a downwardly direction.

11. The filling valve of claim 1, the outlet comprising: a plurality of ports oriented in a downwardly direction defined by an outward angle and a tilt angle, the ports being positioned below the peripheral surface and each having an inlet in communication with the valve body chamber.

12. The filling valve of claim 1, wherein the lip engages the channel seat when gas in introduced into the seal cavity and disengages from the channel seat upon a release of pressurizing gas from the seal cavity, thereby assisting in preventing egress of a liquid introduced into the container above the expandable sealing member.

13. The filling valve of claim 1, further comprising: a valve stem being adapted for operatively moving between a valve open position and a valve closed position, a cap being vertically positioned above the valve stem and vent tube and selectively contacting the valve stem, and a valve cam being positioned above the cap, the valve cam being adapted for pushing the cap and valve stem axially downward into the valve closed position.

14. The filling valve of claim 13, further comprising: a vent seal capable of closing the vent tube positioned beneath the cap, a spring positioned between the cap and the vent seal, the spring being adapted for pressing the vent seal against the vent tube for closing the vent tube when the cap and valve stem are in the valve closed position.

15. The filling valve of claim 1, the nozzle assembly further comprising a snift valve being adapted for releasing pressurizing gas from said container when the snift valve is open, and where the fluid passageway is in communication with the snift valve and operatively positioned for communicating pressurizing gas from the vent tube for expanding the sealing member when the snift valve is closed.

16. The filling valve of claim 1, further comprising a snift valve, a first valve body passageway and a second valve body passageway, each formed in the valve body; the first valve body passageway connecting the seal cavity to the snift valve; the first valve body passageway comprising an aperture through a wall of the valve body.

17. The filling valve of claim 16 further comprising a bell, the bell having a bell passageway connecting a bell inner area to a fluid cavity formed between a lower surface of the valve body and an upper surface of the bell, wherein, when the snift valve is engaged, a cleaning fluid flows through the nozzle and into the bell inner area, then through the bell passageway into the fluid cavity, then into the second valve body passageway, then through a cleaning fluid conduit to an outlet.

18. The filling valve of claim 17 wherein the outlet is routed through the bell and into the second housing passageway and, when a snift actuator causes the snift valve to engage, the cleaning fluid passes around the inside of the seal.

19. The filling valve of claim 1, further comprising a snift valve and a bell, the bell having a first port in an upper interior portion of the bell, the first port connected to a channel formed by the bell and the valve body, and a second port in a back of the valve body, the second port connected to a hose fitting.

20. An expandable sealing member for a filling valve for filling a container, the filling valve having a nozzle assembly having a nozzle outlet and a peripheral surface about a central axis, the peripheral surface comprising a channel seat extending outwardly from the peripheral surface, a snift valve, and a vent tube positioned vertically above the nozzle assembly, the sealing member comprising:
    a valve sealing portion adapted to be operably positioned around the peripheral surface of the nozzle assembly when installed,
    a container sealing surface adapted to be operably positioned on an inside of the container when installed,
    a lip that extends upwardly from the valve sealing portion, and an expanding portion adapted to be operably positioned above the nozzle outlet when installed the expanding portion capable of being expanded by a pressurizing gas introduced from the vent tube into a space above the sealing member when installed, the expanding portion, when installed and expanded, causing a) the valve sealing portion to sealably engage the peripheral surface without interruption, b) the container sealing surface to sealably engage the container when the container is presented to the filling valve, and c) the lip to sealably engage the channel seat, thereby assisting in preventing egress of a liquid introduced into the container above the sealing member when installed, and the snift valve causing a release of pressurizing gas from the space above the sealing member when installed, thereby causing the expanding portion to deflate, and the valve sealing portion, the container sealing surface and the lip to disengage their respective surfaces.

* * * * *